United States Patent [19]

Rohrmann et al.

[11] 4,395,367

[45] Jul. 26, 1983

[54] PROCESS FOR TREATING FISSION WASTE

[76] Inventors: Charles A. Rohrmann, Kennewick; Oswald J. Wick, Richland, both of Wash., granted to U.S. Department of Energy under the provisions of 42 U.S.C. 2182

[21] Appl. No.: 322,144

[22] Filed: Nov. 17, 1981

[51] Int. Cl.$^3$ ............................................. G21F 9/16
[52] U.S. Cl. .............................. 252/629; 75/84.1 A; 75/0.5 BC; 75/122.1
[58] Field of Search .................. 252/629, 627, 626; 75/84.1 A, 122.1, 0.5 B, 0.5 BC; 420/462, 463, 464, 465

[56] References Cited

U.S. PATENT DOCUMENTS

| | | | |
|---|---|---|---|
| 3,110,557 | 11/1963 | Spector | 252/629 |
| 3,848,048 | 11/1974 | Moore | 252/631 |
| 3,853,979 | 12/1974 | McNeese et al. | 75/84.1 A |
| 4,020,004 | 4/1977 | Schulz et al. | 252/629 |
| 4,028,265 | 6/1977 | Barney et al. | 252/626 |
| 4,094,809 | 6/1978 | Ross | 252/626 |

Primary Examiner—Deborah L. Kyle
Assistant Examiner—Howard J. Locker

[57] ABSTRACT

A method is described for the treatment of fission waste. A glass forming agent, a metal oxide, and a reducing agent are mixed with the fission waste and the mixture is heated. After melting, the mixture separates into a glass phase and a metal phase. The glass phase may be used to safely store the fission waste, while the metal phase contains noble metals recovered from the fission waste.

6 Claims, 1 Drawing Figure

PROCESS FOR TREATING FISSION WASTE

The United States Government has rights in this invention pursuant to DOE Contract EY-76-C-06-1830.

BACKGROUND OF THE INVENTION

The invention relates generally to a method for treating fission waste and, more particularly, to a method of recovering valuable materials such as palladium, rhodium, ruthenium, and technetium from fission waste while simultaneously incorporating the remainder of the waste in a glass suitable for long-term storage.

The precious metals content of nuclear reactor waste is considerable. For example, one metric ton of spent nuclear fuel may contain about 2 Kg ruthenium, 0.5 Kg rhodium, 1.5 Kg palladium, and 0.5 Kg technetium. There is an increasing demand for these metals because of their unique properties as catalysts in various chemical processes. However, only limited quantities of these metals are available in the United States. Some, such as R. H. Moore in U.S. Pat. No. 3,848,048, have suggested recovering these metals from aqueous fission waste using chelating agents absorbed on a carbon bed.

A second problem with fission waste is the long-term safe storage of this radioactive material. Some, including Ross in U.S. Pat. Nos. 4,094,809, Schulz in 4,020,004, and Barney in 4,020,265, have suggested the incorporation of radioactive waste in glass or mineral matrix. These products are designed to be thermally stable and highly insoluble so that radioactive waste may be stored for extremely long periods of time with very little chance of adverse environmental impact. The above-referenced patents are incorporated herein by reference.

It is accordingly, an object of this invention to provide a method for recovering palladium, rhodium, ruthenium, or technetium from radioactive fission waste.

It is another object of this invention to provide a method for incorporating radioactive fission waste in a stable leach-resistant solid suitable for long-term storage.

It is an advantage of this invention that valuable metals may be recovered from radioactive fission waste at the same time the waste is being prepared for long-term storage without the addition of excess chemicals which unnecessarily add to the waste disposal problem and without resort to messy aqueous chemistry methods.

Other objects, advantages, and novel features of the invention will be apparent to those of ordinary skill in the art upon examination of the following detailed description of a preferred embodiment of the invention and the accompanying drawing.

SUMMARY OF THE INVENTION

A method is provided for recovering valuable elements from radioactive fission waste at the same time as incorporating the waste in a stable leach resistant solid suitable for long-term storage. The waste is melted together with a glass forming agent, a scavenging metal oxide, and a reducing agent. Subsequently two phases are formed; one a metal phase containing Pd, Rh, Ru, or Tc, and the other a glass phase which may be used for storage.

DESCRIPTION OF THE DRAWING

The FIGURE is a flowsheet of the method of the invention.

DESCRIPTION OF A PREFERRED EMBODIMENT

Figure 1:
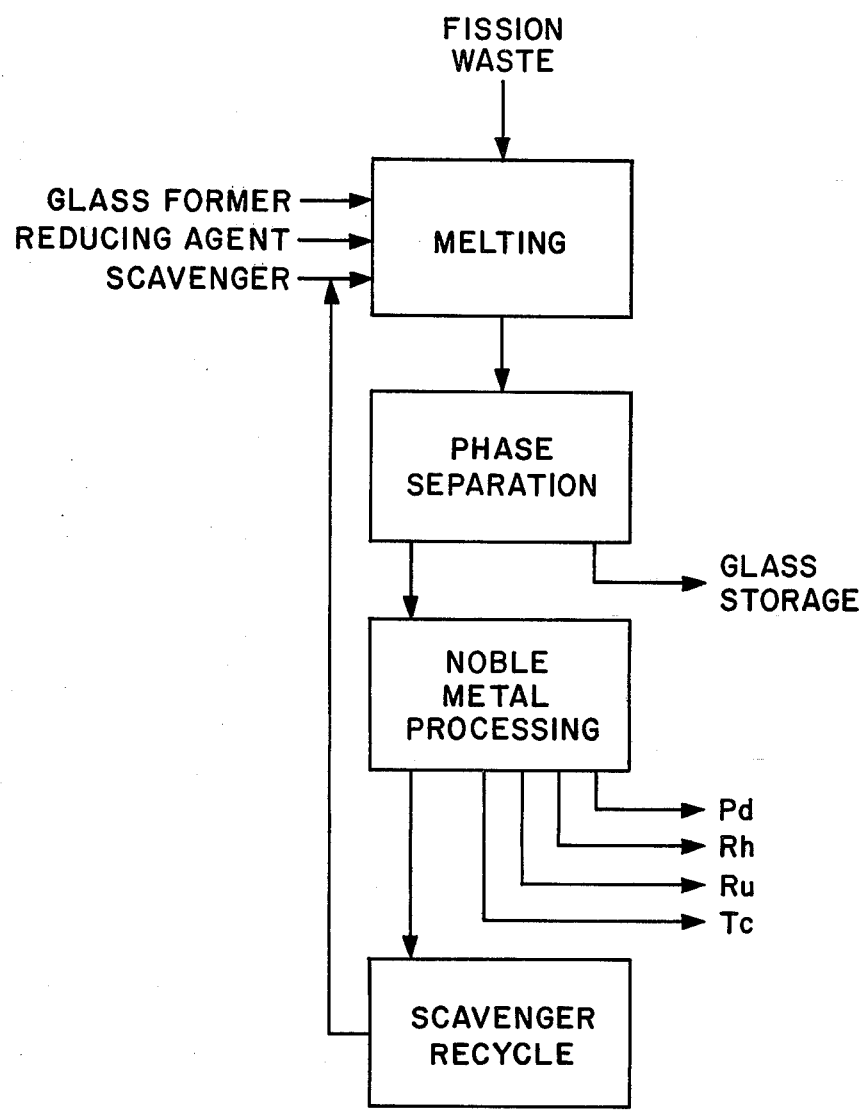

Turning now to the FIGURE, it is seen that in accordance with the invention fission waste is first mixed with a glass former, a reducing agent, and a scavenger and melted. The fission waste is preferably a dry solid such as calcined Purex waste which itself is the residual from first dissolving irradiated nuclear fuel in nitric acid and then recovering the actinides through solvent extraction. However, the process will accommodate many other physical and chemical forms of waste through appropriate adjustment of reagents and operating conditions.

The glass forming agents serve to act as a flux during the subsequent melting step, aiding in the phase separation, and then as a matrix for long-term waste storage. The glass forming agents must first produce a flux having a low viscosity at low melt temperatures and then produce a glass having high leach resistance under storage conditions. Suitable glass forming agents include $SiO_2$, $B_2O_3$, $Na_2CO_3$ and $CaO$. A convenient method for using these agents is to first prepare a glass frit from the desired mixture of the glass forming agents and then to use the glass frit in the invention.

The scavenger may be a scavenger metal oxide such as $PbO$, $Bi_2O_3$, $Sb_2O_3$, $SnO$, or $CuO$. The reductant may be Si or a C containing substance such as graphite, coal, flour, sugar, silicon, or SiC.

One embodiment of the invention contemplates first drying and calcining the fission waste and then intimately mixing with the glass former, the reducing agent, and the scavenger oxide. The mixture is then heated to melt the glass former. The reducing agent reacts with the scavenger metal oxide to produce molten scavenger metal. Due to differences in density between the glass and the metal phases, the metal tends to settle, carrying with it noble metals, including Pd, Rh, Ru, and Tc, which are either dissolved or wet by the scavenger metal. The metal phase and glass phase may then be easily separated by either pouring off the various liquid phases or by allowing the liquids to freeze and mechanically separating the solids.

Another embodiment of the invention contemplates first melting the glass forming agent to form a pool of molten glass. The fission waste is then added and dissolved in the molten glass. In this embodiment, there is no need to dry or calcine the fission waste, as the heat of the molten glass will drive off any water present and denitrate the waste if it was in the nitrate form. Then the scavenger metal oxide may be added and dissolved in the melt. Finally, addition of the reducing agent causes the reduction of the scavenger metal oxide to scavenger metal and formation of the two phases.

After the glass and metal phases have been separated, the glass may be prepared for long-term storages. If desired, the composition of the glass may be adjusted at this point to maximize the stability and leach resistance of the glass. The actual composition of the glass will depend on the expected storage environment. Proposed environments include deep burial in salt, deep burial in basalt, or storage on the ocean floor.

The metal phase may then be processed to recover the noble metals by a process similar to that employed by a platinum-group metals refinery. For example, those noble metals soluble in aqua regia are dissolved in that acid and then separated from each other via successive precipitations. Those noble metals insoluble in aqua regia are dissolved using a peroxide fusion and then separated from each other via distillation and successive precipitations.

The scavenger metal may then be converted back to the oxide and recycled to the melting step. In this manner, the noble metals may be recovered without unnecessarily adding more bulk to the waste to be stored.

EXAMPLE 35.67 grams of a fission waste designated Pw-4b calcine* was mixed with 60.0 grams of 76-101 frit**, 80.0 grams PbO, 4.0 grams graphite, and 102.61 grams of $Na_2CO_3$. The mixture was heated in a porcelain crucible for one hour at 1050° C. The molten batch was poured out and allowed to cool. Chemical analysis of the resultant lead metal and glass phases showed that 94% of the Pd, 48% of the Rh, and 88% of the Tc was concentrated in the lead phase.

*Typical composition of Pw-4b calcine is 1.51% $Fe_2O_3$, 0.35% $Cr_2O_3$, 0.14% NiO, 0.67% $P_2O_5$, 0.35% $Rb_2O$, 1.06% SrO, 0.60% $Y_2O_3$, 4.94% $ZrO_2$, 5.18% $MoO_3$, 1.29% $Tc_2O_7$, 2.907% $RuO_2$, 0.48% $Rh_2O_3$, 1.48% PdO, 0.09 $Ag_2O$, 0.10% CdO, 0.73% $TeO_2$, 2.88T $Cs_2O$, 1.57% BaO, 1.48% $La_2O_3$, 3.32% CeO, 1.48% $Pr_6O_{11}$, 4.52% $Nd_2O_3$, 0.12% $Pm_2O_3$, 0.20% $Eu_2O_3$, 0.14% $Gd_2O_3$, 1.17% $U_3O_8$, 0.86% $NpO_2$, 0.01% $PuO_2$, 0.18% $Am_2O_3$, 0.04% $Cm_2O_3$, and balance $Na_2O$.
**76-101 frit is a glass frit prepared from 60% $SiO_2$, 14% $B_2O_3$, 11% $Na_2O$, 7.5% ZnO, 3% CaO, and 4.5% $TiO_2$. . . .

A series of experiments designed to test the use of various reductants with various scavengers gave the following noble metal recovery:

TABLE 1

| Scav- | % Palladium Recovery |||||| 
| | Reductant |||||| 
| enger | Graphite | Flour | Sugar | Cornstarch | Si | Charcoal |
|---|---|---|---|---|---|---|
| Sn | 100 | 0 | 0 | 0 | 0 | 0 |
| Bi | 83 | 97 | 93 | 54 | 100 | — |
| Sb | 84 | 100 | 95 | 86 | 100 | — |
| Cu | 100 | 0 | 0 | 0 | 0 | 0 |
| Pb | 100 | 0 | 100 | 75 | 100 | — |

TABLE 2

| Scav- | % Rhodium Recovery |||||| 
| | Reductant |||||| 
| enger | Graphite | Flour | Sugar | Cornstarch | Si | Charcoal |
|---|---|---|---|---|---|---|
| Sn | 100 | 0 | 0 | 0 | 0 | 0 |
| Bi | 100 | 100 | 100 | 56 | 100 | — |
| Sb | 100 | 100 | 100 | 100 | 100 | — |
| Cu | 100 | 0 | 0 | 0 | 0 | 0 |
| Pb | — | 0 | 100 | — | 100 | — |

TABLE 3

| Scav- | % Ruthenium Recovery |||||| 
| | Reductant |||||| 
| enger | Graphite | Flour | Sugar | Cornstarch | Si | Charcoal |
|---|---|---|---|---|---|---|
| Sn | 55 | 0 | 0 | 0 | 0 | 0 |
| Bi | 19 | 44 | 63 | 27 | 89 | — |
| Sb | 67 | 62 | 19 | 73 | 76 | — |
| Cu | 100 | 0 | 0 | 0 | 0 | 0 |
| Pb | — | 0 | 62 | — | 57 | — |

The foregoing description of a preferred embodiment of the invention has been presented for purposes of illustration and is not intended to be exhaustive or to limit the invention to the precise form disclosed. It was chosen and described in order to best explain the principles of the invention and then practical application to thereby enable others skilled in the art to best utilize the invention in various embodiments and with various modifications as are best suited to the particular use contemplated. It is intended that the scope of the invention be defined by the claims appended hereto.

We claim:
1. A process for the treatment of fission waste comprising:
  (a) mixing a glass forming agent, a scavenging metal oxide, and a reducing agent with said fission waste;
  (b) melting said mixture and thereby forming a glass phase and a metal phase;
  (c) separating the two phases; and
  (d) cooling said glass phase and thereby forming a stable leach-resistant solid suitable for long-term storage of radioactive materials.
2. The process of claim 1 wherein the glass forming agent comprises $SiO_2$. $B_2O_3$, $Na_2CO_3$, CaO, or glass prepared therefrom.
3. The process of claim 1 wherein the scavenging metal oxide is PbO, $Bi_2O_3$, $Sb_2O_3$, SnO, or CuO.
4. The process of claim 1 wherein the reducing agent comprises Si or C.
5. The process of claim 1 wherein said metal phase comprises scavenging metal and Pd, Rh, Ru, or Tc.
6. The process of claim 5 wherein said Pd, Rh, Ru, or Tc is separated from said metal phase and the scavenging metal is oxidized and recycled to step (a).

* * * * *